(12) United States Patent
Yokoyama

(10) Patent No.: US 7,019,727 B2
(45) Date of Patent: Mar. 28, 2006

(54) DISPLAY DEVICE

(75) Inventor: Ryoichi Yokoyama, Ohgaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 367 days.

(21) Appl. No.: 09/953,235

(22) Filed: Sep. 17, 2001

(65) Prior Publication Data

US 2002/0036627 A1    Mar. 28, 2002

(30) Foreign Application Priority Data

Sep. 18, 2000  (JP)  ............................. 2000-282170

(51) Int. Cl.
*G09G 3/36*   (2006.01)

(52) U.S. Cl. ............................ 345/98; 345/92; 345/100

(58) Field of Classification Search .................. 345/87, 345/90, 92, 93, 98, 100, 204–206, 55, 30, 345/99
See application file for complete search history.

(56) References Cited

U.S. PATENT DOCUMENTS

| | | | |
|---|---|---|---|
| 4,733,105 A * | 3/1988 | Shin et al. ................... | 327/333 |
| 5,712,652 A * | 1/1998 | Sato et al. .................... | 345/90 |
| 5,751,261 A | 5/1998 | Zavracky et al. | |
| 5,774,106 A * | 6/1998 | Nitta et al. .................... | 345/98 |
| 5,790,090 A | 8/1998 | Libsch et al. | |
| 5,945,972 A | 8/1999 | Okumura et al. | |
| 5,952,991 A | 9/1999 | Akiyama | |
| 5,977,940 A | 11/1999 | Akiyama et al. | |
| 6,023,308 A | 2/2000 | Takemura | |
| 6,072,454 A | 6/2000 | Nakai et al. | |
| 6,107,981 A * | 8/2000 | Fujita .......................... | 345/95 |
| 6,211,854 B1* | 4/2001 | Fujiyoshi ..................... | 345/10 |
| 6,333,737 B1* | 12/2001 | Nakajima ................... | 345/205 |

FOREIGN PATENT DOCUMENTS

| | | |
|---|---|---|
| EP | 0 797 182 | 9/1997 |
| EP | 1 020 840 | 7/2000 |
| EP | 1020840 A1 | 7/2000 |
| JP | 58-23091 | 2/1983 |

(Continued)

OTHER PUBLICATIONS

European Office Action dated Apr. 18, 2005, directed to counterpart EP application.

*Primary Examiner*—Amr A. Awad
*Assistant Examiner*—Leonid Shapiro
(74) *Attorney, Agent, or Firm*—Morrison & Foerster LLP

(57) ABSTRACT

The retaining circuit 110, which retains the digital image signal fed from the drain signal line 61 in response to the signal inputted from gate signal line 51, is formed. The signal selection circuit 120, which selects one of the two signals (signal A or signal B) in response to the signal from the retaining circuit 110 and which supplies the selected signal to the display electrode 80, is formed. Also, the reference voltage generation circuit 500, which provides the signal A and signal B, is formed within the display panel 100. When the display device is under the digital display mode, the reference voltage generation circuit 500 prepares the signal fed to the display electrode 80. Thus, there is no need to supply the signal A or signal B from outside, resulting in the simpler configuration of the external circuits. Also, since the drive of the external circuits can be completely halted under the digital display mode, it is possible to further reduce the consumption of the electric power.

12 Claims, 7 Drawing Sheets

FOREIGN PATENT DOCUMENTS

| | | | |
|---|---|---|---|
| JP | 5823091 | * | 10/1983 |
| JP | 59-65879 | | 4/1984 |
| JP | 08-194205 | | 7/1996 |
| JP | 09-236823 | | 9/1997 |
| JP | 1014334 A2 | * | 6/2000 |
| JP | 2001-242819 | | 9/2001 |

* cited by examiner

DISPLAY DEVICE

TECHNICAL FIELD OF THE INVENTION

This invention relates to a display device, especially to a display device of low energy consumption which is incorporated into a portable communication and computing device.

BACKGROUND OF THE INVENTION

There has been a great demand in the market for portable communication and computing devices such as a portable TV and a cellular phone. All these devices need a small, light-weight and low-power consumption display device, and efforts has been made accordingly.

FIG. 8 shows a circuit diagram corresponding to a single pixel element of a conventional liquid crystal display device. A gate signal line 51 and a drain signal line 61 are placed on an insulating substrate (not shown in the figure) perpendicular to each other. A TFT 65 connected to the two signal lines 51, 61 is formed near the intersection of the two signal lines 51, 61. The source 11s of the TFT 65 is connected to a display electrode 80 of the liquid crystal 21.

A storage capacitor element 85 holds the voltage of the display electrode 80 during one field period. One terminal 86 of the storage capacitor 85 is connected to the source 11s of the TFT 65, and the other terminal 87 is provided with a voltage common among all the pixel elements. When a scanning signal is applied to the gate signal line 51, the TFT 65 turns to an on-state. Accordingly, an analog image signal from the drain signal line 61 is applied to the display electrode 80, and the storage capacitor 85 holds the voltage. The voltage of the image signal is applied to the liquid crystal 21 through the display electrode 80, and the liquid crystal 21 aligns in response to the applied voltage for providing a liquid crystal display image. This configuration is capable of showing both moving images and still images. There is a need for the display to show both a moving image and a still image within a single display. One such example is to show a still image of a battery within area of a moving image of a cellular phone display to show the remaining amount of the battery power.

However, the configuration shown in FIG. 8 requires a continuous rewriting of each pixel element with the same image signal at each scanning in order to provide a still image. This is basically to show a still-like image in a moving image mode, and the scanning signal needs to activate the TFT 65 at each scanning. Accordingly, it is necessary to operate a driver circuit which generates a driver signal for the scanning signals and the image signals, and an external LSI which generates various signals for controlling the timing of the driver circuit, resulting in a consumption of a significant amount of electric power. This is a considerable drawback when such a configuration is used in a cellular phone device which has only a limited power source. That is, the time a user can use the telephone under one battery charge is considerably short.

Japanese Laid-Open Patent Publication No. Hei 8-194205 discloses another configuration for display device suited for portable applications. This display device has a static memory for each of the pixel elements, as shown in FIG. 9. A static memory, in which two inverters INV1 and INV2 are positively fed back to each other, holds the image signal for reducing the power consumption. In this configuration, a switching element 24 controls the resistance between a reference line and a display electrode 80 in response to the divalent digital image signal held by the static memory in order to adjust the biasing of the liquid crystal 21. The common electrode, on the other hand, receives an AC signal Vcom. Ideally, this configuration does not need refreshing the memory when the image stays still for a period of time.

As described above, the conventional liquid crystal display device shown in FIG. 8 is suitable for displaying a full color moving image generated by analog signals. On the other hand, the display device equipped with a static memory for holding digital image signals is suitable for displaying a still image with shallow depth and reducing the consumption of the electric power.

Since the two types of the liquid crystal display device need different types of image signal source respectively, there has been no liquid crystal device capable of showing both a full color moving image and a still image of low-energy consumption in a single display.

SUMMARY OF THE INVENTION

This invention is directed to a display device enabling both a full color moving picture display and a still picture display of low energy consumption in a single display device, for example, one liquid crystal display panel. This invention is also directed to the high-density integration and the reduction of the electric power consumption of the liquid crystal display device with a static memory for holding digital image signals. The gist of the invention will be described below.

According to this invention, there is provided an active matrix display device having a plurality of gate signal lines disposed in a predetermined direction on a substrate, a plurality of drain signal lines disposed in a direction perpendicular to the predetermined direction, a plurality of display electrodes disposed at intersections of the gate signal lines and the drain signal lines for forming an matrix, a retaining circuit which holds a digital image signal from the drain signal line in response to a signal from the gate signal line and receives high and low voltages, a signal selection circuit which selects one of a first and second voltage in response to a signal form the retaining circuit and provides the display electrode with one of the first and second voltage, and a reference voltage generation circuit which outputs the first voltage, the second voltage or the first and second voltage and is disposed on the substrate.

In this configuration, since there is no need to supply the first and or second voltage from the outside, it is possible to completely halt the drive of the external circuits under the digital display mode, resulting in the reduction of the consumption of the electric power.

There is provided an active matrix display device having a plurality of gate signal lines disposed in a predetermined direction on a substrate, a plurality of drain signal lines disposed in a direction perpendicular to the predetermined direction, a plurality of display electrodes disposed at intersections of the gate signal lines and the drain signal lines for forming an matrix, a retaining circuit which holds a digital image signal from the drain signal line in response to a signal from the gate signal line and receives high and low voltages, said retaining circuit being disposed for each of the display electrodes, a signal selection circuit which selects one of a first and second voltage in response to a signal form the retaining circuit and provides the display electrode with said one of the first and second voltage, and an inverter which inverts the first voltage and outputs the inverted first voltage as the second voltage.

In this configuration, the second voltage is prepared by inverting the first voltage by the inverter formed on the substrate. Thus, it is possible to omit the wiring for feeding voltage, resulting in the high integration of the pixel element.

Also, there is provided an active matrix display device having a plurality of gate signal lines disposed in a predetermined direction on a substrate, a plurality of drain signal lines disposed in a direction perpendicular to the predetermined direction, a plurality of display electrodes disposed at intersections of the gate signal lines and the drain signal lines for forming an matrix, a retaining circuit which holds a digital image signal from the drain signal line in response to a signal from the gate signal line and receives high and low voltages, and a signal selection circuit which selects one of a first and second voltage in response to a signal form the retaining circuit and provides the display electrode with said one of the first and second voltage. The signal selection circuit comprises a first complementary transistor for selecting the first voltage and a second complementary transistor for selecting the second voltage.

In this configuration, since the signal selection circuit comprises complementary transistors, it is possible to reduce the driving voltage of the retaining circuit, resulting in the further reduction of the consumption of the electric power.

DESCRIPTION OF THE INVENTION

Figure 1:
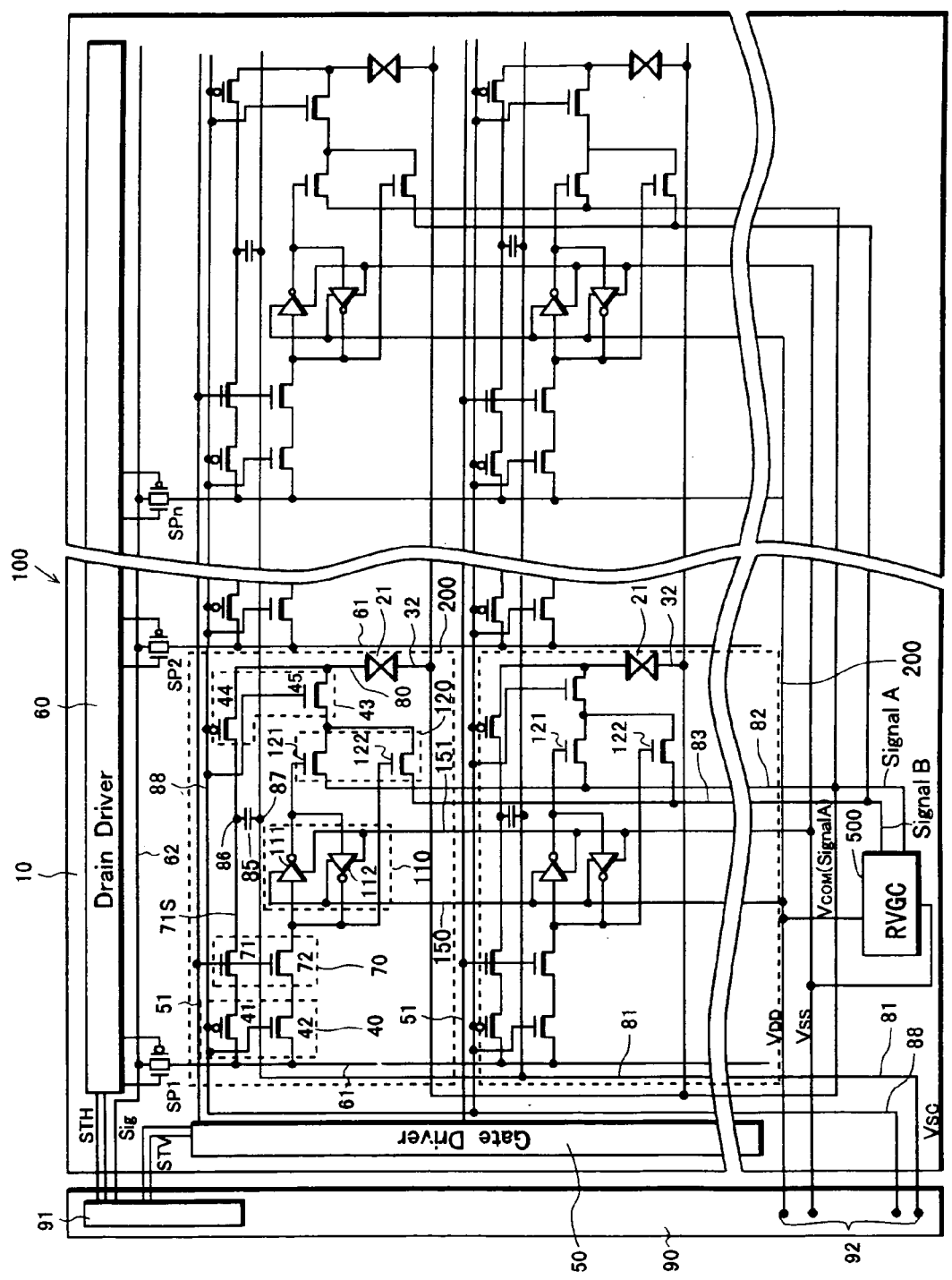
FIG. 1 is a circuit diagram of a liquid crystal display device to which this invention is applied.

The display device relating to the first embodiment of this invention will be explained. FIG. 1 shows a circuit diagram of a liquid crystal display device to which the display device of this invention is applied.

A plurality of the gate signal lines 51 connected to a gate driver 50 for providing scanning signals are aligned in one direction on an insulating substrate 10. A plurality of drain signal lines 61 are aligned on the insulating substrate in a direction perpendicular to the direction of the gate signal lines 51.

Sampling transistors SP1, SP2, . . . , SPn turn on in response to the timing of the sampling pulse fed from the drain driver 60, and connect the drain signal lines 61 to the data signal lines 62 carrying the data signal, which is the digital image signal or the analog image signal.

The display panel 100 consists of a plurality of pixel elements 200 provided in a matrix configuration. These pixel elements 200 are selected by the scanning signal fed from the gate signal line 51 and receive the date signal fed from drain signal line 61.

A circuit selection circuit 40 having a P-channel TFT 41 and a N-channel TFT 42 is placed near the intersection of the gate signal line 51 and the drain signal line 61. The drains of TFTs 41, 42 are connected to the drain signal line 61 and gates of the two TFTs are connected to circuit selection signal line 88. One of the two TFTs 41, 42 turns on in response to a selection signal fed from the circuit selection signal line 88. As described below, a similar circuit selection circuit is provided to cooperate with the circuit selection circuit 40.

pair of the two circuit selection circuits 40, 43 enables the switching between the analog image display (full color moving image) and the digital image display (still image and low energy consumption). A pixel element selection circuit 70 having a N-channel TFT 71 and a N-channel TFT 72 is placed next to the circuit selection circuit 40. The TFTs 71, 72 are connected to the TFTs 41, 42 of the circuit selection circuit 40 in series and both gates of the TFTs 71, 72 are connected to the gate signal line 51. Both of the TFTs 71, 72 turn on at the same time in response to the scanning signal fed from the gate signal line 51.

A storage capacitor element 85 holds the analog image signal in the analog mode. The electrode 86, one of the electrodes of the storage capacitor element 85 is connected to the source 71s of the TFT 71. Another electrode 87 is connected to a common storage capacitor line 81 carrying a bias voltage Vcs. In the analog mode, when the analog image signal is applied to the liquid crystal 21 after the opening of the gate of the TFT 71, the voltage of the applied signal reduces even during a one field period, resulting in a loss of the homogeneity of the display image. The storage capacitor element 85 maintains the applied voltage at the initial level during one field period for eliminating the problem above.

A P-channel TFT 44 of the circuit selection circuit 43 is placed between the storage capacitor element 85 and the liquid crystal 21, and turns on and off in synchronization with the switching of the TFT 41 of the circuit selection circuit 40.

A retaining circuit 110 and signal selection circuit 120 are placed between the TFT 72 of the pixel element selection circuit 70 and the display electrode 80 of the liquid crystal 21. The retaining circuit 110 has two inverter circuits 111, 112, which are positively fed back to each other, and forms a static memory of digital divalent. To the two inverter circuits 111, 112, the voltage Vdd and the voltage Vss (the voltage Vdd> the voltage Vss) are applied as the power voltage. It is preferable that the two inverter circuits 111, 112 be CMOS type inverters for the reduction of the electric power consumption.

The signal selection circuit 120 has two N-channel TFTs 121, 122 and selects a signal in response to the signal fed from the retaining circuit 110. The gate of the TFT 121 is provided with the output of the inverter 111, and the gate of the TFT 122 is provided with the output of the inverter 112 respectively. Since two complementary output signals from the retaining circuit 110 are applied to the gates of the two TFTs 121, 122, respectively, only one of the two TFTs 121, 122 turns on at a time.

The two signals selected by the signal selection circuit 120 are the common electrode signal Vcom (signal A) of AC voltage and the AC drive signal (signal B) for driving the liquid crystal, which is an AC voltage around the common electrode signal Vcom. The signal A and signal B are of rectangular wave form and opposite phase, and driven by the AC voltage between the voltage Vdd and the voltage Vss for driving the inverter circuits 111, 112 of the retaining circuit 110.

Here, when TFT 122 is on, the signal B is selected and when TFT 121 is on, the signal A is selected. The selected signal A or B is then applied to the display electrode 80, which supplies the voltage to the liquid crystal 21, through the TFT 45 of the circuit selection circuit 43. The common electrode 32 of the liquid crystal 21 is provided with the common electrode signal Vcom (signal A).

The two signals A, B can also be supplied from an external circuit board 90, the peripheral circuit of the display panel 100. However, in this embodiment, there is provided a reference voltage generation circuit 500 for generating signals A and B on the insulating substrate 10 of the display panel 100. Thus, it is not necessary to supply the signals A, B from outside in this embodiment. That is, the voltage Vdd and the voltage Vss are supplied to the reference voltage generation circuit 500 as the power voltage, as they are supplied to the retaining circuit 110. And the signals A and B are prepared based on the voltages Vdd and Vss.

Thus, it is possible to make the external circuit board 90 simpler. Furthermore, since the signals A, B necessary for the digital display mode can be provided within the liquid crystal display panel 100, only the power voltages Vdd and Vss are needed to be supplied from outside. Thus, the drive of the external circuits (including the a panel drive LSI 91, which will be described later, and the external circuit board 90) can be completely halted, resulting in the reduction of the electric power consumption of the system as a whole.

Figure 2:
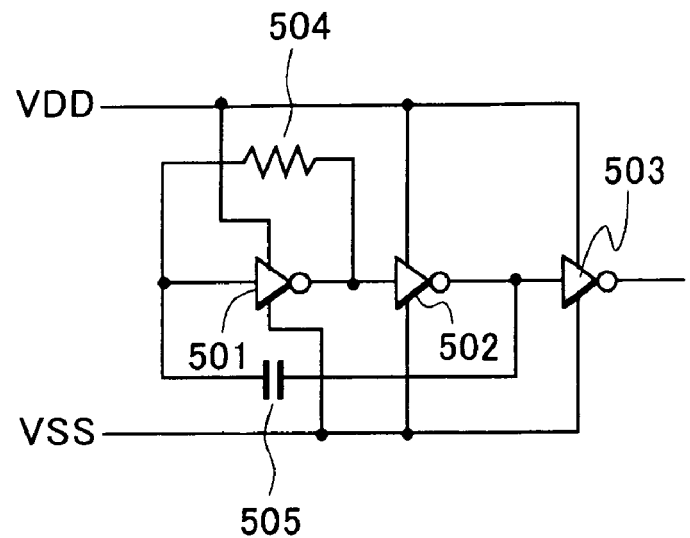
FIG. 2 is a circuit diagram of a reference voltage generation circuit of the first embodiment of this invention.

Next, the circuit configuration of the reference voltage generation circuit 500 will be explained. As shown in FIG. 2, the inverter circuit 501 and the inverter circuit 502 are connected in series. The output of the inverter circuit 502 is fed back to the input of the inverter circuit 501 through the condenser 505 with the capacity value of C. The output of the inverter circuit 501 is fed back to its input through the resistance 504 with the resistance value of R.

In the above configuration, the oscillation frequency can be adjusted by adjusting the time constant of R and C. The reference numeral 503 is the inverter circuit for buffer for adjusting the oscillation wave shape. To each of the inverter circuits 501, 502, 503, the voltages Vdd and Vss are supplied as the power voltage for driving. The signal A described above can be obtained from the output of the inverter circuit 503. Also, the signal B is obtained from the output of the inverter circuit, which is connected to the output of the inverter circuit 503.

Figure 3:
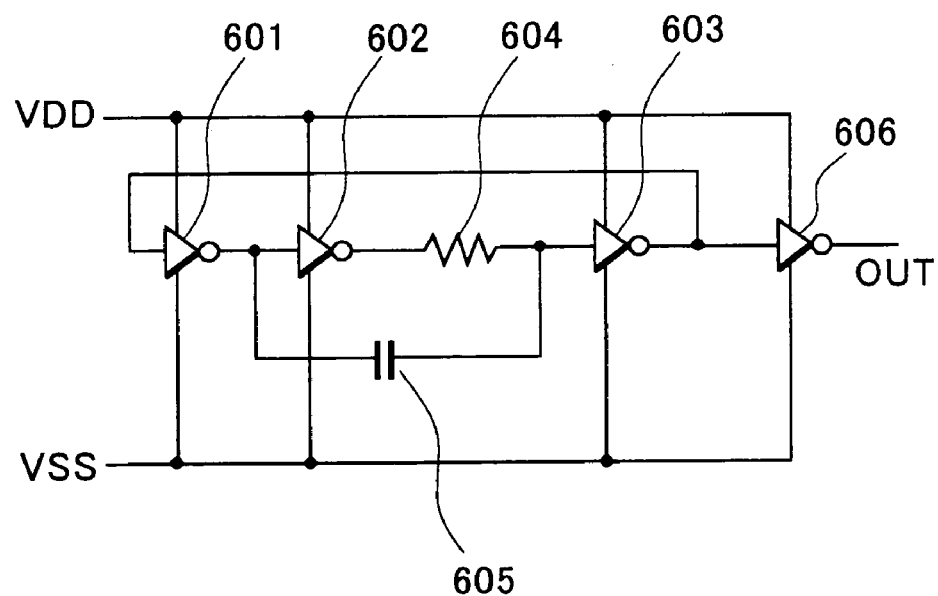
FIG. 3 is another circuit diagram of a reference voltage generation circuit of the first embodiment of this invention.

Next, another circuit diagram of the reference voltage generation circuit 50 will be explained. This is a ring oscillator. As shown in FIG. 3, the inverter circuits in odd numbers, the inverter circuits 601, 602, 603 form a feed back loop and generate oscillation by the internal delay. The oscillation frequency can be adjusted by adjusting the time constant, which is determined by the resistance value R of the resistance 604 and the capacity value C of the condenser 605.

The liquid crystal display panel has peripheral circuits as well. A panel drive LSI 91 is mounted on an external circuit board 90 fitted to the insulating substrate 10 of the liquid crystal panel 100, and sends the vertical start signal STV and the horizontal start signal STH to the gate driver 50 and the drain driver 60, respectively. The panel drive LSI also feeds the image signal to the data line 62.

Figure 4:
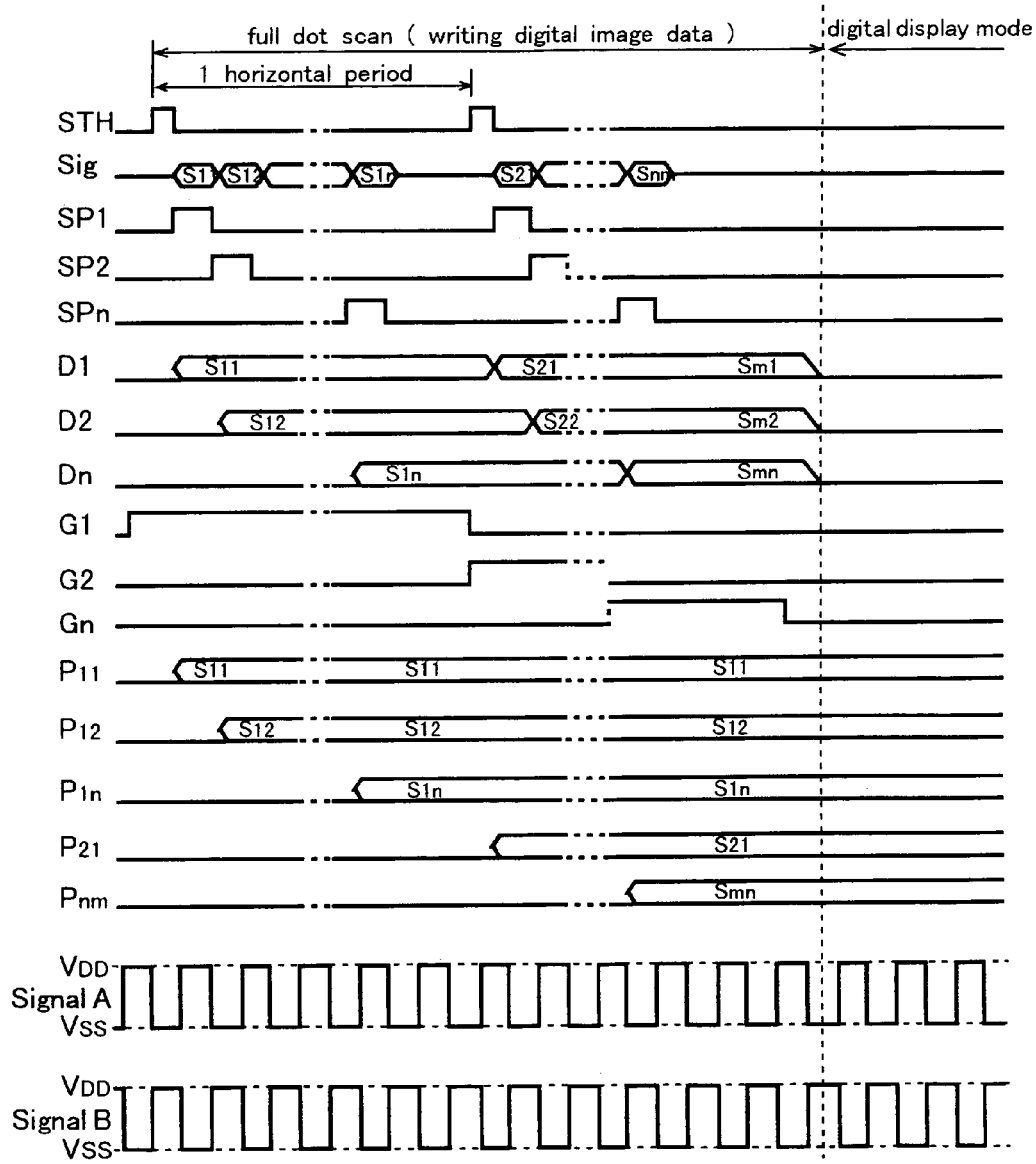
FIG. 4 is a timing chart of a liquid crystal display device of the first embodiment of this invention.

Next, a driving method of the display device having the configuration above will be described below in reference to FIGS. 1–4. FIG. 4 shows a timing chart when the liquid crystal display device is set to operate under the digital display mode.

(1) Analog Display Mode

The analog display mode is selected in response to a display mode selection signal (in this case L). Then, a switching circuit operates to output the analog image signal to the data line 62, and the voltage applied on the circuit selection signal line 88 changes to L so that the TFTs 41, 44 of the circuit selection circuits 40, 43 turn on.

The sampling transistor SP turns on in response to the sampling signal based on the horizontal start signal STH so that the analog image signal is provided to the drain signal line 61 through the data signal line 62.

The scanning signal is provided to the gate signal line 51 in accordance with the vertical start signal STV. When the TFT 71 turns on in response to the scanning signal, the analog image signal Sig is applied, through the drain signal line 61, to the display electrode 80 and the storage capacitor element 85, which holds the applied voltage. The liquid crystal 21 aligns itself in accordance with the image signal voltage applied to the liquid crystal 21, resulting in a display image.

This analog display mode is suitable for showing a full color moving image because the image signal voltage is successively inputted. However, the external LSI 91 on the circuit board 90, and the drivers 50, 60 continuously consume the electric power for driving the liquid crystal display device.

(2) Digital Display Mode

When the digital display mode is selected in response to the mode selection signal (H), the data signal line 62 is set to receive the digital image signal. At the same time, the voltage of the circuit selection signal line 88 turns to H, and the retaining circuit 110 is set to be operable. Further, the TFTs 41, 44.of the circuit selection circuits 40, 43 turn off and the TFTs 42,45 turn on.

The panel drive LSI 91 on the external circuit board 90 sends start signals STV, STH to the gate driver 50 and the drain driver 60. In response to the start signal, sampling signals are sequentially generated and turn on the respective sampling transistors SP1, SP2, . . . , SPn sequentially, which sample the digital image signal Sig and send it to each of the drain signal lines 61.

Now, the operation of the first row of the matrix, or the portion of the circuit connected to the gate signal line 51, which receives the scanning signal G1, will be described below. First, the scanning signal G1 turns on each TFT of the pixel elements P11, P12, . . . , P1n connected to the gate signal line 51, for one horizontal scanning period.

In the pixel element P11 located at the upper left corner of the matrix, the sampling transistor SP1 takes in the digital signal S11 and feeds it to the drain signal line 61. The TFT 72 turns on in response to the scanning signal G1, and the drain signal D1 is inputted to the retaining circuit 110 of the pixel element P11.

The signal retained by the retaining circuit 110 is then fed to the signal selection circuit 120, and is used by the signal selection circuit 120 to select one of the signal A and signal B. The selected signal is then applied to the liquid crystal 21 through the display electrode 80.

Thus, after a completion of a scanning from the first gate signal line 51 on the top row of the matrix to the last gate signal line 51 on the bottom row of the matrix, a full display frame scan (one field scan) or full dot scanning is completed and the digital signals are written in each of the pixel element. As a result, the display device shows an image corresponding to the digital image signals retained by the retaining circuit 110.

When one image is displayed, the supply of the power voltage to the circuits not required to operate during the digital mode such as the gate driver 50, the drain driver 60 and the external panel drive LSI 91 (the timing controller 305) is stopped. Here, as described before, the signal A and the signal B are generated from the reference voltage generation circuit 500 on the insulating substrate 10 of the liquid crystal display panel 100. Thus, it is enough to supply the power voltages Vdd and Vss to the retaining circuit 110 and the reference voltage generation circuit 500 from outside of the liquid crystal display panel 110.

When the retaining circuit 110 receives the digital image signal of H (high) through the drain signal line 61, the first TFT 121 of the signal selection circuit 120 receives a L signal through the inverter circuit 111 and accordingly turns off, and the second TFT 122 receives a H signal through the inverter circuit 112 and turns on.

In this case, the signal B is selected and the liquid crystal 21 receives the signal B. Since the display electrode 80 receives the signal having a phase opposite to the signal A applied to the common electrode 32, resulting in the rearrangement of the liquid crystal 21. Since the display panel is in a NW mode, a black image results.

When the retaining circuit 110 receives the digital image signal of L through the drain signal line 61, the first TFT 121 of the signal selection circuit 120 receives a H signal and accordingly turns on, and the second TFT 122 receives a L signal and turns off. In this case, the signal A is selected and the display electrode 80 of the liquid crystal 21 receives the signal A, which is the same as the signal A applied to the common electrode 32. As a result, there is no change in the arrangement of the liquid crystal 21 and the pixel element stays white.

As described above, the signals corresponding to one field are written, and then, a still image is displayed based on the signals retained in the retaining circuit. Thus, it is possible to significantly reduce the amount of the electric power consumed by the liquid crystal display device by halting the supply of the power voltage to the driver circuits 50, 60, and the external LSI 91. Also, the consumption of the electric power can be further reduced by completely halting the drive of the external circuits, since there is no need to supply the signal A and signal B from outside.

Figure 5:
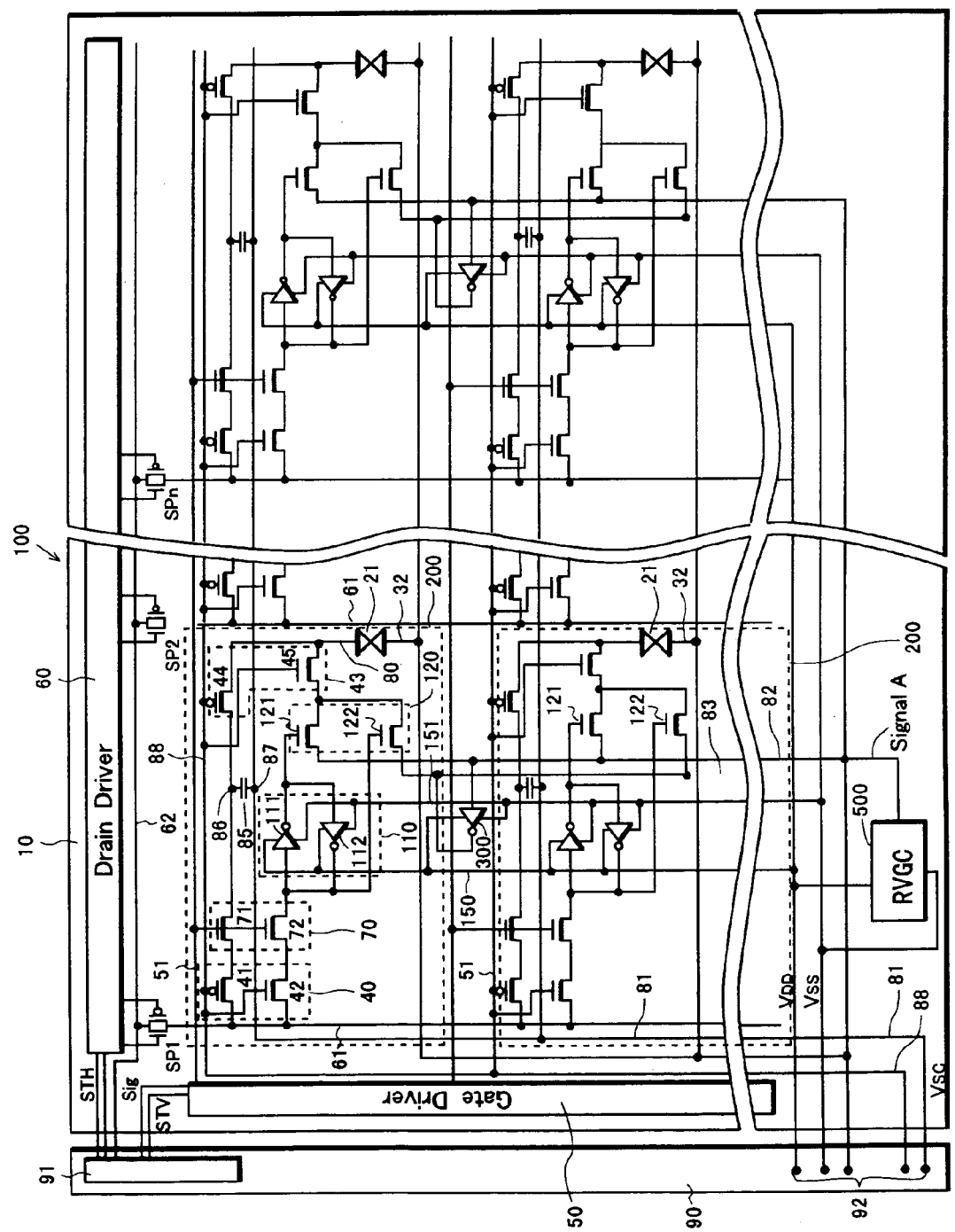
FIG. 5 is a circuit diagram of a liquid crystal display device of the second embodiment of this invention.

FIG. 5 shows a circuit diagram of the liquid crystal display device of the second embodiment of this invention. In this embodiment, the signal B is prepared by inverting the signal A (the common electrode signal Vcom) through the inverter 300. By this, the wiring for the signal B within the display panel 100 can be omitted, resulting in the high integration of the pixel element 200.

There are two possible ways to achieve the above configuration. In the first method, the signal A is supplied from the external circuit board 90 and inverted through the inverter 300 on the insulating substrate 10 of the display panel 100. The second method is to provide the reference voltage generation circuit 500 for generating the signal A on the insulating substrate 10 of the display panel 100 as shown in FIG. 5. By this, as in the first embodiment, only the power voltages Vdd and Vss, not the signal A and signal B, need to be supplied from outside. It is preferable that the inverter 300 be a CMOS type inverter for reducing the electric power consumption. The configuration of the reference voltage generation circuit 500 is the same as described above.

Figure 6:
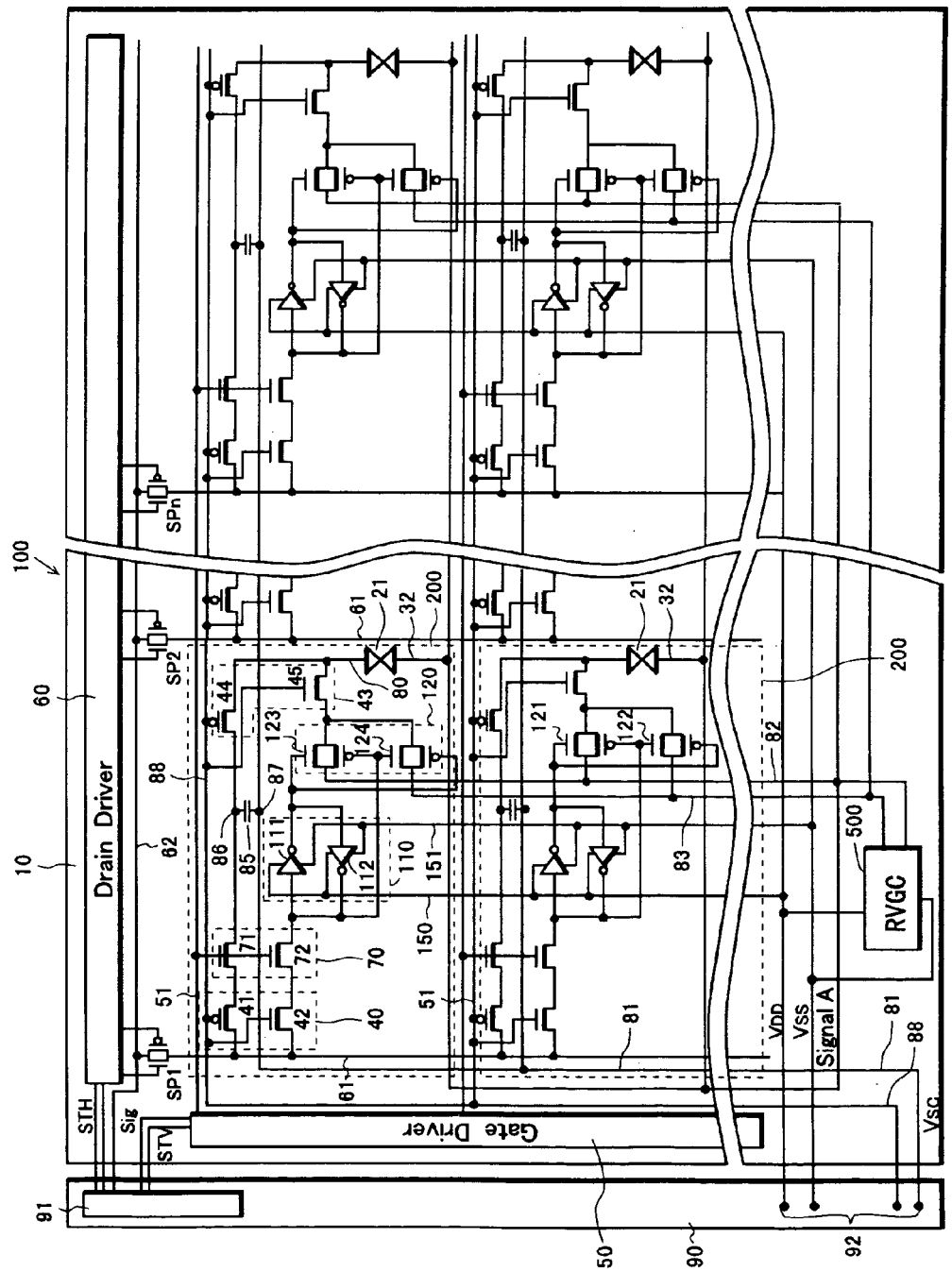
FIG. 6 is a circuit diagram of a liquid crystal display device of the third embodiment of this invention.

FIG. 6 is a circuit diagram of the liquid crystal display device of the third embodiment of this invention. In the first and second embodiments of this invention, the signal selection circuit 120 comprises two N-channel TFTs 121, 122, and the complementary output signals from the retaining circuit 110 are applied to the gates of the two TFTs 121, 122. That is, the signal selection circuit 120 comprises single channel type transmission gates. However, the characteristic of this embodiment is the fact that the signal selection circuit 120 comprises CMOS type transmission gates. When the signal selection circuit 120 comprises single channel type transmission gates, the high level output of the retaining circuit should be high in order to feed enough electric current to the TFTs 121, 122. If the enough current does not go through the TFTs 121, 122, the levels of signal A and B through the signal selection circuit 120 is lowered and the contrast in the liquid crystal display is deteriorated. However, it is necessary to increase the power voltage Vdd to the retaining circuit 110 in order to rise the high level output of the retaining circuit 110, resulting in the increased electric power consumption. As shown in FIG. 6, the above problem can be eliminated if the signal selection circuit 120 comprises CMOS type transmission gates 123, 124 (complementary TFT). In this embodiment, the high level output of the retaining circuit 110 can be kept as the same voltage of the maximum value of the signal A and B without lowering the level of signal A or B. By this, it is possible to reduce the consumption of the electric power without deteriorating the contrast of the liquid crystal display.

Also, for the same reason stated above, it is preferable that the TFT 45 of the signal selection circuit 43 comprise the CMOS type transmission gates (complementary TFT).

Also in this embodiment, it is possible to have the configuration, in which the signal A and B are generated by the reference voltage generation circuit 500. However, it is also possible, as in the second embodiment, to provide the signal B by inverting the signal A through the inverter 300.

It is preferable that the display device of this invention be applied to a liquid crystal display device, especially to a reflection-type liquid crystal display device. A device structure of a reflection-type liquid crystal display device will be described in reference to FIG. 7.

The element denoted by the reference numeral 10 is an insulating substrate on one side of the display device, and the element denoted by the reference numeral 11 is an isolated polysilicon semiconductor layer 11 on the substrate 10. A gate insulating film 12 is placed on top of the polysilicon semiconductor layer 11, and 1 gate electrode 13 is placed on the portion of the insulating film 12 corresponding to the polysilicon semiconductor layer 11.

Figure 7:
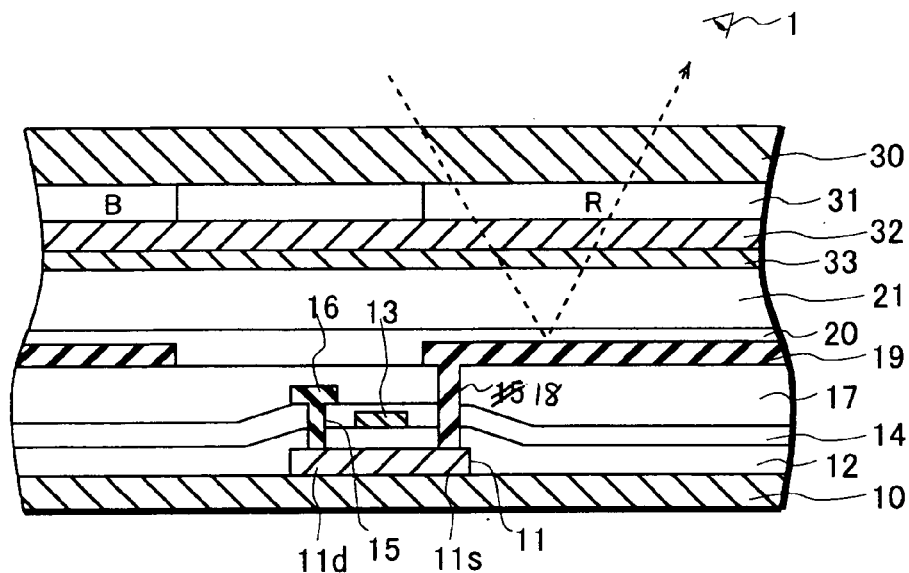
FIG. 7 is a cross-sectional view of a reflection-type liquid crystal display device.
Figure 8:
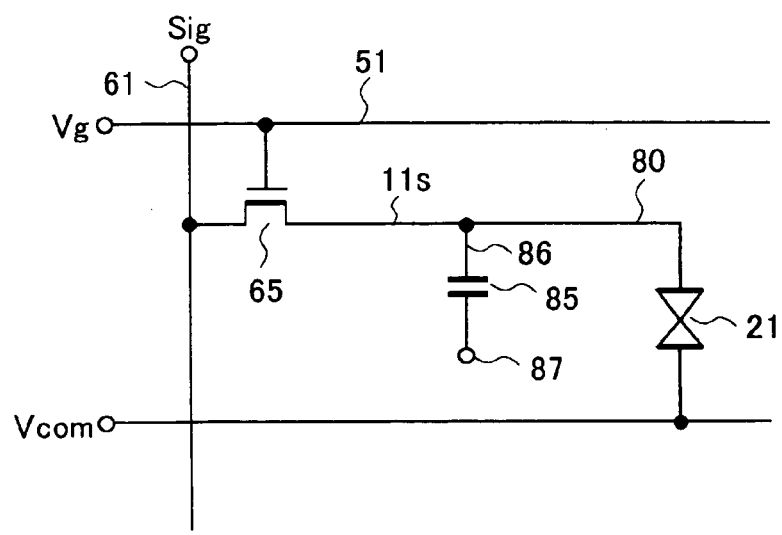
FIG. 8 is a circuit diagram of a conventional liquid crystal display device.
Figure 9:
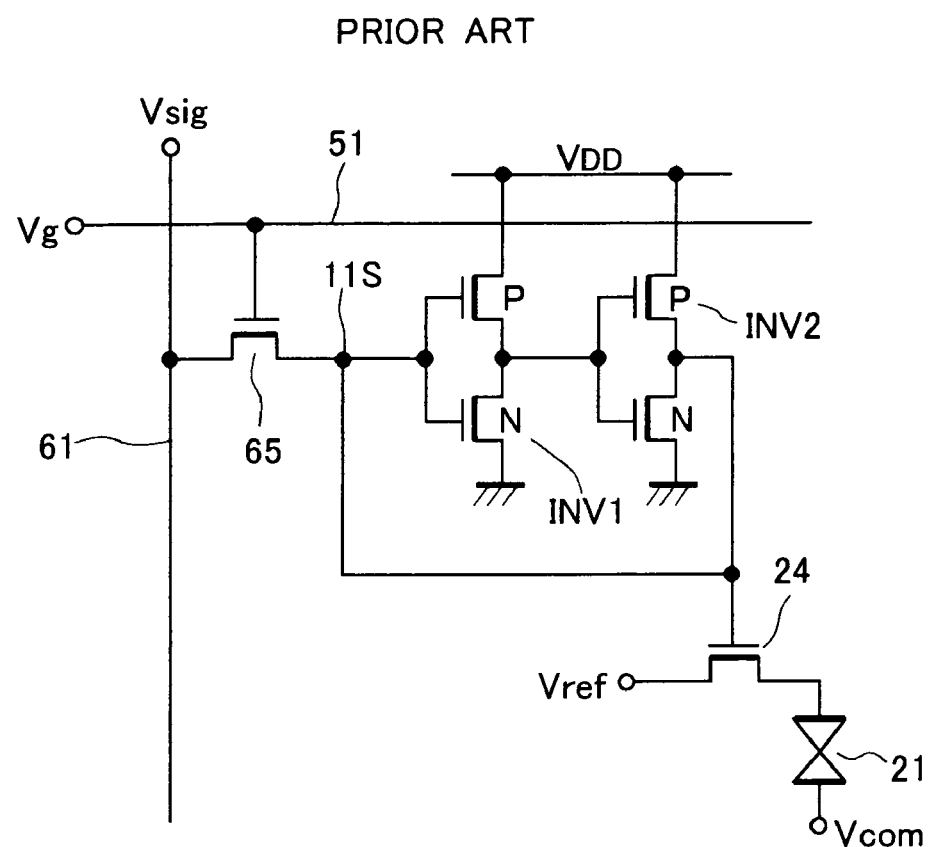
FIG. 9 is another circuit diagram of a conventional liquid crystal display device.

A source 11s and a drain 11d are formed in the semiconductor layer 11 at the portions located at both sides of the gate electrode 13, as shown in FIG. 7. An interlayer insulating film 14 is deposited above the gate electrode 13 and the gate insulating layer 12. Contact holes 15, 18 are formed at the portions of the interlayer insulating film 14 corresponding to the drain 11d and the source 11s. The drain 11d is connected to a drain electrode 16 through the contact hole 15, and the source 11s is connected to a display electrode 19 also through the contact hole 18 piercing through the interlayer insulating film 14 and a flattening insulating film 17 formed on the interlayer insulating film 14.

The display electrode 19 is formed on the flattening insulating film 17 and is made of a reflecting electrode material, for example, an aluminum (Al). An orientation film 20 is formed on the display electrode 19 and the portion of the flattening insulating film 17 not covered by the display electrode 19. The orientation film 20 is made of polyimid and aligns the liquid crystal 21.

The insulating substrate 30 on the other side of the display device has color filters 31 for generating red (R), green (G), and blue (B) colors, a common electrode 32 made of a transparent electrode material such as ITO (indium tin oxide), and an orientation film 33 for aligning the liquid crystal.

The liquid crystal fills the gap between the two insulating substrates 10, 30, which are attached together by sealing the peripheral portions of the two insulating substrates with an sealing adhesive such that there is a predetermined space for the liquid crystal 21 between them.

As shown in FIG. 7, the light coming from an observer 1 side through the common electrode 32 and incident on the display electrode 19 is reflected by the display electrode 19 so that the observer 1 recognizes the light modulated by the liquid crystal 21 of the display device.

In this configuration, the display device utilized the light external to the device and does not need an internal light source such as the one known as a back light in the transmitting-type liquid crystal display device. By applying the display device of this invention to the reflection-type liquid crystal display device, it is possible to further reduce the consumption of the electric power since there is no need for the internal light source consuming the electric power in the reflection-type display device.

In the above embodiment, one bit digital data single is used in the digital display mode. The display device of this invention is not limited to that embodiment, and is also applied to a multiple bit digital data signal system in which a multiple level image representation is possible. In this configuration, the retaining circuits and the signal selection circuits are provided in accordance with the number of the bits in the system.

Furthermore, in the above embodiment, only a portion of the liquid crystal display panel is used for displaying the still image. The display device of this invention is not limited to that embodiment, and the still image may be displayed in the entire area of the display panel.

Still furthermore, in the above embodiment, the reflection-type liquid crystal display device is used. The display device of this invention is not limited to that embodiment, and is applied to transmitting-type liquid crystal display device as well. In that case, it is possible to reduce the parasitic capacity with maintaining the original transmittance, if transparent electrode is applied to the area except the portions for the TFT, retaining circuit, signal selection circuit, and signal wiring within one pixel element. Even if this invention is applied to the transmitting-type liquid crystal display device, it is also possible to reduce the consumption of the electric power by stopping supplying the voltage to the gate driver 50, drain driver 60 and external panel drive LSI 91 after displaying one screen.

As explained above, in the display device of this invention, when the device is under the digital display mode, the signals, which are fed to the pixel element, are prepared by the reference voltage generation circuit formed within the display panel. Thus, there is no need to supply the signals from outside, and the external circuits can be made simple. Also, it is possible to reduce the electric power consumption, since the drive of the external circuits can be completely halted under the digital display mode.

Additionally, by providing the inverter for inverting the signals fed to the pixel element within the display panel, it is possible to omit the wiring for the inverted signals, resulting in the high integration of the device.

Furthermore, by providing the signal selection circuit comprising complementary transistors, which selectively supplies the signal to the pixel element electrode, it is possible to reduce the power voltage of the retaining circuit, resulting in the further reduction of the consumption of the electric power.

The above is a detailed description of particular embodiments of the invention. It is recognized that departures from the disclosed embodiments may be made within the scope of the invention and that obvious modifications will occur to a person skilled in the art. The full scope of the invention is set out in the claims that follow and their equivalents. Accordingly, the claims and specification should not construed to narrow the full scope of protection to which the invention is entitled.

What is claimed is:

1. An active matrix display comprising:
a plurality of gate signal lines disposed in a predetermined direction on a substrate;
a plurality of drain signal lines disposed in a direction different from the predetermined direction;
a plurality of display electrodes disposed adjacent to intersections of the gate signal lines and the drain signal lines for forming an matrix;
a retaining circuit which holds a digital image signal from a corresponding drain signal line in response to a signal from a corresponding gate signal line and receives a high voltage and a low voltage, said retaining circuit being provided for at least one of the display electrodes;
a signal selection circuit which selects a first voltage or a second voltage in response to a signal from the retaining circuit and provides a corresponding display electrode with the first voltage or the second voltage, said signal selection circuit being provided for the retaining circuit; and
a reference voltage generation circuit which outputs to the signal selection circuit the first voltage, the second voltage or the first and second voltages, and is disposed on the substrate,
wherein the reference voltage generation circuit is configured to be driven by a difference between the high and low voltages, and the signal selection circuit comprises a first complementary transistor for selecting the first voltage and a second complementary transistor for selecting the second voltage.

2. An active matrix display device, comprising:
a plurality of gate signal lines disposed in a predetermined direction on a substrate;
a plurality of drain signal lines disposed in a direction different from the predetermined direction;
a plurality of display electrodes disposed adjacent to intersections of the gate signal lines and the drain signal lines for forming an matrix;
a retaining circuit which holds a digital image signal from a corresponding drain signal line in response to a signal from a corresponding gate signal line and receives a high voltage and a low voltage, said retaining circuit being provided for at least one of the display electrodes;
a signal selection circuit which receives a first voltage and a second voltage, selects the first voltage or the second voltage in response to a signal from the retaining circuit and provides a corresponding display electrode with the first voltage or the second voltage; and an inverter which is disposed on the substrate, inverts the first voltage and outputs the inverted first voltage as the second voltage, wherein the first and second voltages are generated by a difference between the high and low voltages, and the signal selection circuit comprises a first complementary transistor for selecting the first voltage and a second complementary transistor for selecting the second voltage.

3. An active matrix display device comprising:

a plurality of gate signal lines disposed in a predetermined direction on a substrate;

a plurality of drain signal lines disposed in a direction different from the predetermined direction;

a plurality of display electrodes disposed adjacent to intersections of the gate signal lines and the drain signal lines for forming an matrix;

a retaining circuit which holds a digital image signal from a corresponding drain signal line in response to a signal from a corresponding gate signal line and receives a high voltage and a low voltage, said retaining circuit being provided for at least one of the display electrodes;

a signal selection circuit which selects a first voltage or a second voltage in response to a signal from the retaining circuit and provides a corresponding display electrode with the first voltage or the second voltage, said signal selection circuit being provided for the retaining circuit; and an AC reference voltage generation circuit which outputs the first voltage, the second voltage or the first and second voltages, and is disposed on the substrate, the AC reference voltage generation circuit being configured to generate an oscillation by an internal delay within the AC reference voltage generation circuit.

4. An active matrix display device comprising:

a plurality of gate signal lines disposed in a predetermined direction on a substrate;

a plurality of drain signal lines disposed in a direction different from the predetermined direction;

a plurality of display electrodes disposed adjacent to intersections of the gate signal lines and the drain signal lines for forming an matrix;

a retaining circuit which holds a digital image signal from a corresponding drain signal line in response to a signal from a corresponding gate signal line and receives a high voltage and a low voltage, said retaining circuit being provided for at least one of the display electrodes;

a signal selection circuit which selects a first voltage or a second voltage in response to a signal from the retaining circuit and provides a corresponding display electrode with the first voltage or the second voltage, said signal selection circuit being provided for the retaining circuit; and a reference voltage generation circuit which outputs the first voltage, the second voltage or the first and second voltages, and is disposed on the substrate, the reference voltage generation circuit being configured to generate an oscillation by an internal delay within the reference voltage generation circuit, wherein the reference voltage generation circuit is configured to be driven by a difference between the high and low voltages.

5. The active matrix display device of claim 3, wherein the first and second voltages are of rectangular wave form and opposite phase.

6. The active matrix display device of claim 3, further comprising an inverter disposed on the substrate, wherein the reference voltage generation circuit outputs the first voltage, and the inverter inverts the first voltage and outputs the inverted first voltage as the second voltage.

7. The active matrix display device of claim 3, wherein the first and second voltages are generated by a difference between the high and low voltages.

8. The active matrix display device of claim 3, wherein the signal selection circuit comprises a first complementary transistor for selecting the first voltage and a second complementary transistor for selecting the second voltage.

9. The active matrix display device of claim 4, wherein the first and second voltages are of rectangular wave form and opposite phase.

10. The active matrix display device of claim 4, further comprising an inverter disposed on the substrate, wherein the reference voltage generation circuit outputs the first voltage, and the inverter inverts the first voltage and outputs the inverted first voltage as the second voltage.

11. The active matrix display device of claim 4, wherein the first and second voltages are generated by the difference between the high and low voltages.

12. The active matrix display device of claim 4, wherein the signal selection circuit comprises a first complementary transistor for selecting the first voltage and a second complementary transistor for selecting the second voltage.

* * * * *